United States Patent [19]
Miyano

[11] Patent Number: 5,488,484
[45] Date of Patent: Jan. 30, 1996

[54] IMAGE DATA PROCESSING APPARATUS WITH ADJUSTMENT OF IMAGE PORTION PASTE-IN POSITION TO MINIMIZE AMOUNT OF COMPRESSED IMAGE DATA

[75] Inventor: Yuichi Miyano, Kanagawaken, Japan

[73] Assignee: Kabushiki Kaisha Toshiba, Kawasaki, Japan

[21] Appl. No.: 260,630

[22] Filed: Jun. 14, 1994

[30] Foreign Application Priority Data

Jun. 15, 1993 [JP] Japan .................................. 5-142429

[51] Int. Cl.⁶ ............................ H04N 1/387; H04N 1/40; H04N 1/415
[52] U.S. Cl. ........................ 358/433; 358/450; 382/239; 382/284
[58] Field of Search ..................................... 358/426, 432, 358/433, 448, 450, 452, 453; 385/56

[56] References Cited

FOREIGN PATENT DOCUMENTS 15958  9/1992  European Pat. Off.
392753 9/1992  WIPO.

OTHER PUBLICATIONS

"Patent Abstracts of Japan", Dec. 1988, vol. 012, No. 476 (E-693).
"Patent Abstracts of Japan", Mar. 1994, vol. 018, No. 137 (E-1518).
"Patent Abstracts of Japan", Sep. 1993, vol. 017, No. 511 (E-1432).
"Patent Abstracts of Japan", Aug. 1991, vol. 015, No. 326 (E-1102).
Proceedings of the 1993 IEICE Spring Conference, Part 7, Information and Systems, D-252, Shimura et al., Mar. 28-31, 1993.
"Adobe Photoshop", User Guide, Japanese Edition from Adobe Systems Incorporated Japan (no translation).

Primary Examiner—Scott A. Rogers
Attorney, Agent, or Firm—Cushman, Darby & Cushman

[57] ABSTRACT

The image data processing apparatus includes a position adjusting means for adjusting a paste-in position in pasting a secondary image in a primary image, an image data editing means for editing the image of a third image resulted by the pasting of the secondary image in the primary image, an image data compressing means for compressing the image data through a block encoding, an optimal value detecting means for detecting an optimal value of the compressed image data by absolutely or relatively determining an amount of the compressed data compressed by the image data compressing means, and means for automatically adjusting the paste-in position within a given space around the paste-in position so as that the amount of the compressed data becomes a minimum.

1 Claim, 6 Drawing Sheets

IMAGE DATA PROCESSING APPARATUS WITH ADJUSTMENT OF IMAGE PORTION PASTE-IN POSITION TO MINIMIZE AMOUNT OF COMPRESSED IMAGE DATA

FIELD OF THE INVENTION

The present invention generally relates to an image data processing apparatus, and more particularly, to an image data processing apparatus for editing images on personal computers and the like.

BACKGROUND OF THE INVENTION

Recently in an image data processing apparatus it is developed to edit for correcting or modifying images of photographs or pictorial arts by inputting them into personal computers as image data by using an image scanner.

However, it becomes need to compress the image data because of increasing of the capacity of a memory device which is necessary for storing the image data and also for an object of implementing a data communication or a data exchange to other apparatus, in accompanied with the increase of image data to be edited.

Now, as a high efficiency compression system of a still picture a block encoding system such as the JPEG (Joint Photographic Expert Group) system is commonly used.

If these image data compressing systems are supported in a hardware or a software of the image data editing apparatus, the compression of image data for storing may be carried out after the image editing. While if these image data compressing systems are not supported in such a hardware or a software, the compression of the image data may be carried out after storing them with an appropriate image format.

FIG. 1 is a block diagram showing one embodiment of the conventional image data compressing apparatus. A user performs an editing work on an image data by using a user interface 11. The image date is processed by a data processing means 12 in response to the input operation of the user. The processed image data is displayed on a monitor of an image display means 13. When storing the processed image data it is stored in a data storing means 15 such as a magnetic disc after compressing by a data compressing means 14.

In the image editing operation a paste work for pasting different small image on a base image is frequently carried out. For example it is frequently carried out to paste the image which had been cut out from any other secondary image and stored in a memory, on a primary image to be used as a base image.

Here when storing the edited image data by compressing based on the JPEG system, a compression rate or a picture quality extensively varies even though a image paste-in position has been slightly shifted. It is because a result of a quantization or an adaptive DCT processing varies in accordance with where a contour of the image is located within a 8×8 pixel block associated with a DCT (an abbreviation of Discrete Cosine Transform) operation.

However in a conventional image editing scheme as the editing of image data and a compression for storing images are completely independent to each other, it is not taken into account for an effect which a slight shift of the image paste-in position largely influences on the compression rate or the picture quality.

As described above, the conventional image data processing apparatus has such problems that as the editing of image data and a compression fop storing images are completely independent to each other, it is not taken into account for an effect which a slight shift of the image paste-in position largely influences on the compression rate or the picture quality thus causing the image data after compression to be left in large amount of volume.

SUMMARY OF THE INVENTION

It is, therefore, an object of the present invention to provide an image data processing apparatus which adjusts an image paste-in position so that an amount of edited image data becomes a minimum thus resulting in an improvement of compression efficiency.

In order to achieve the above object, an image data processing apparatus according to one aspect of the present invention includes a position adjusting means for adjusting a paste-in position in pasting a secondary image in a primary image, an image data editing means for editing the image of a third image resulting from pasting of the secondary image in the primary image, an image data compressing means for compressing the image data through block encoding, an optimal value detecting means for detecting an optimal value of the compressed image data by absolutely or relatively determining an amount of the compressed data output by the image data compressing means, and means for automatically adjusting the paste-in position within a given space around the paste-in position so as that the amount of the compressed data becomes a minimum.

The apparatus as constructed as above pastes the secondary image in the primary image as a base image to the secondary image, and then compresses a third resulted by the paste-in editing of images by using the image data compression means.

The apparatus also automatically adjusts the paste-in position so that the amount of the image data compressed by the image compression means becomes minimum.

Additional objects and advantages of the present invention will be apparent to persons skilled in the art from a study of the following description and the accompanying drawings. which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
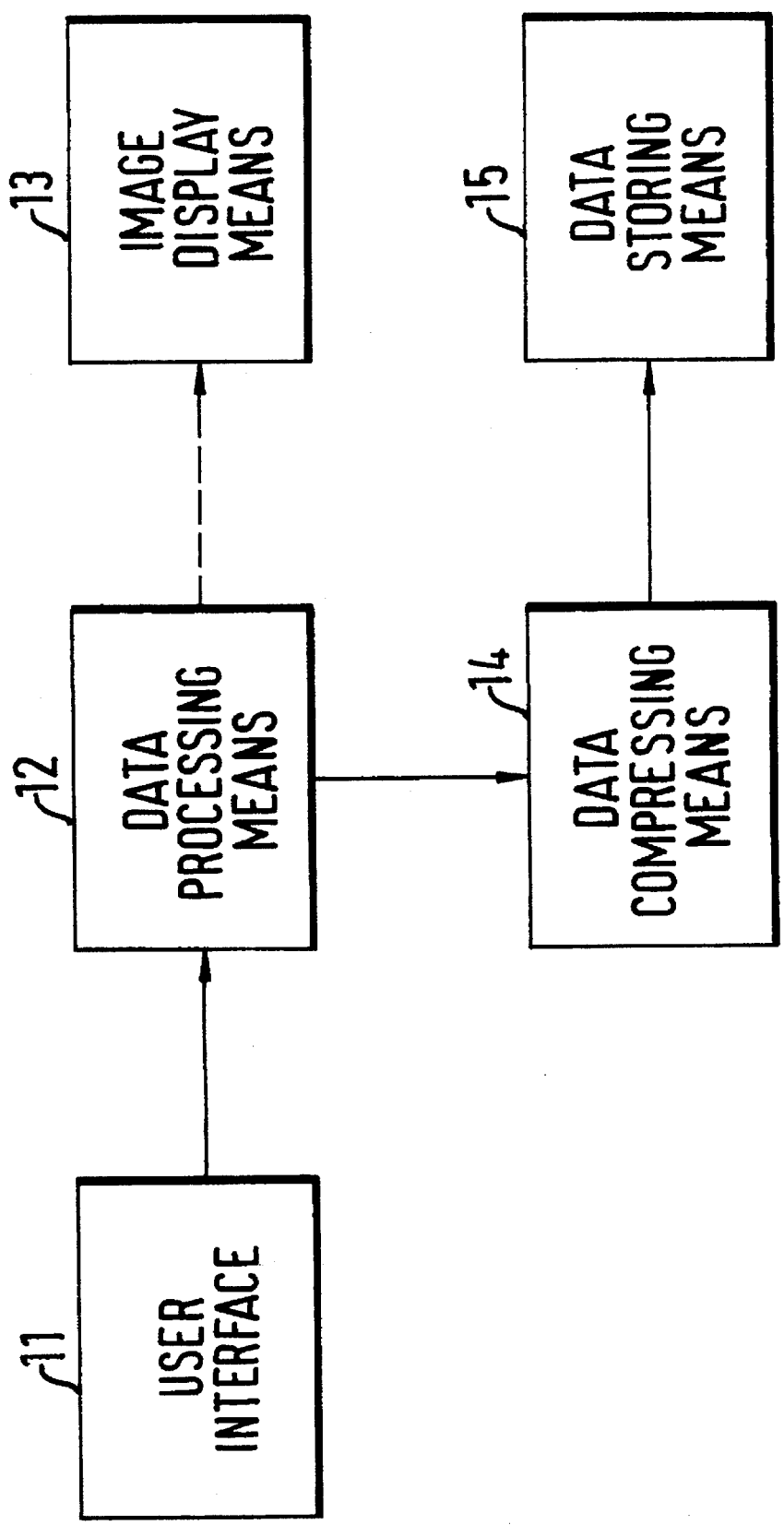
FIG. 1 is a block diagram showing a conventional image data processing apparatus.

The present invention will be described in detail with reference to the FIGS. 2 through 7.

Throughout the drawings, like or equivalent reference numerals or letters will be used to designate like or equivalent elements for simplicity of explanation.

Figure 2:
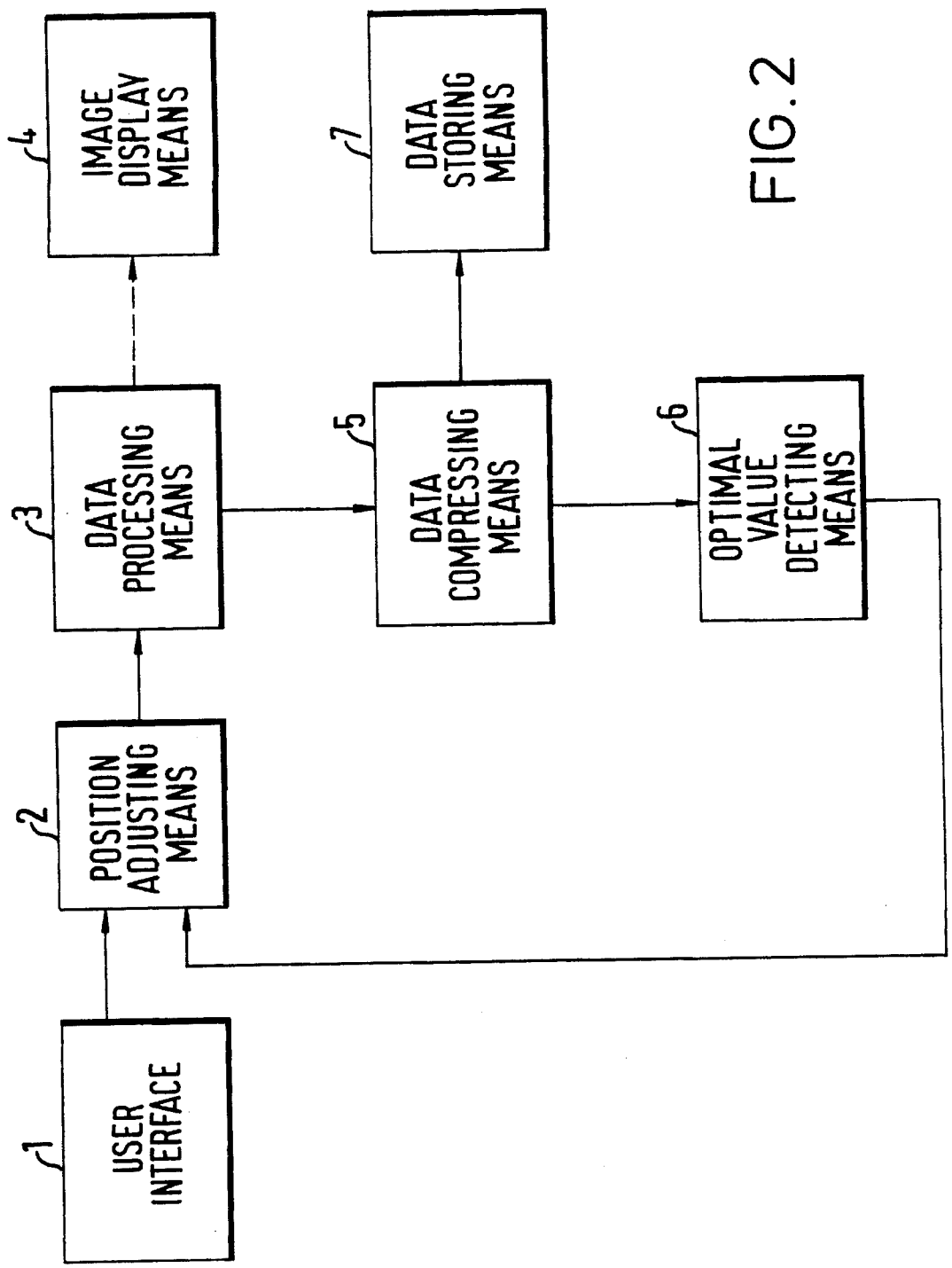
FIG. 2 is a block diagram showing one embodiment of the image data processing apparatus according to the present invention.
Figure 3:
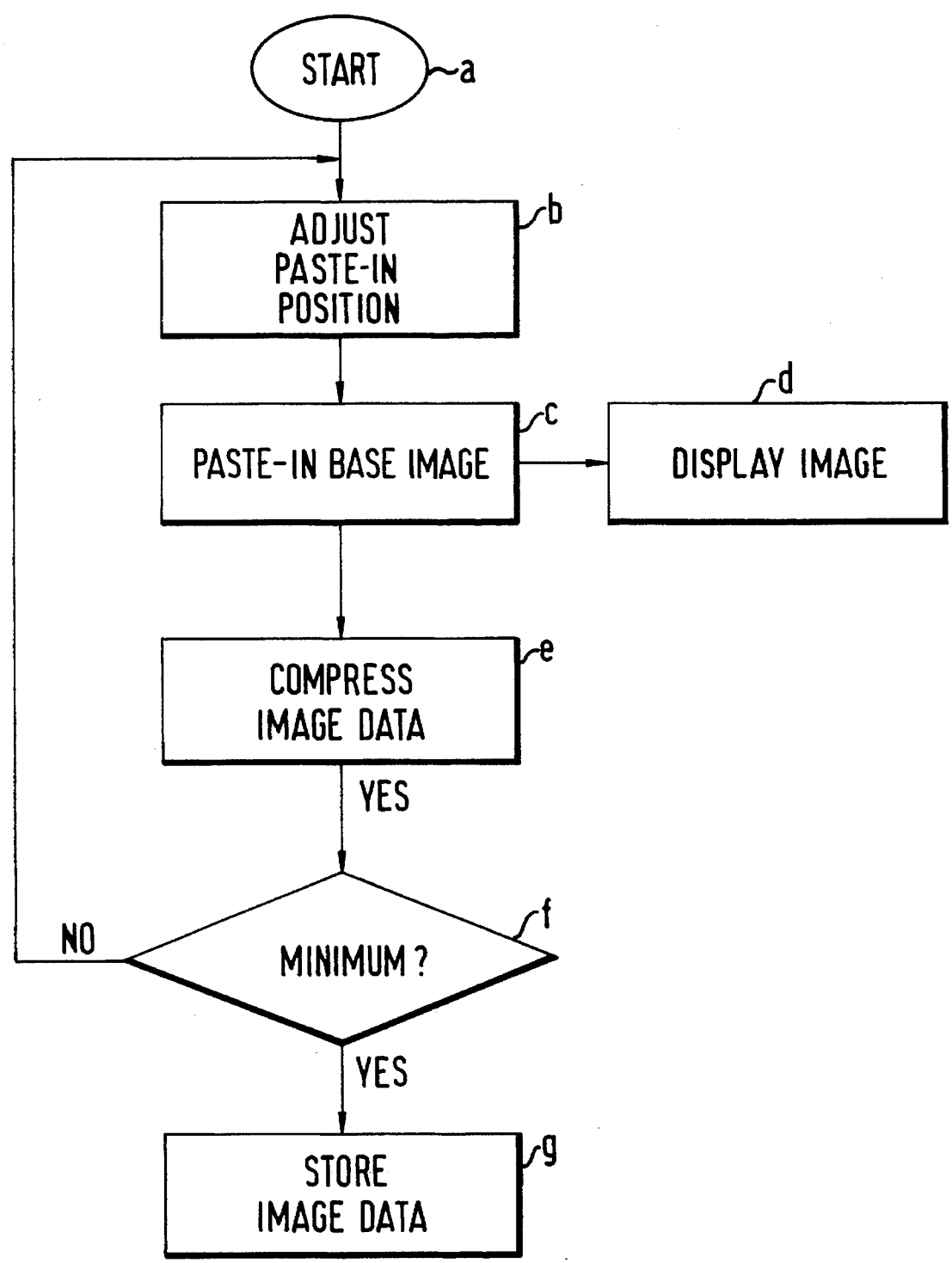
FIG. 3 is a flowchart explaining the operation of the embodiment shown in FIG. 2.
Figure 4:
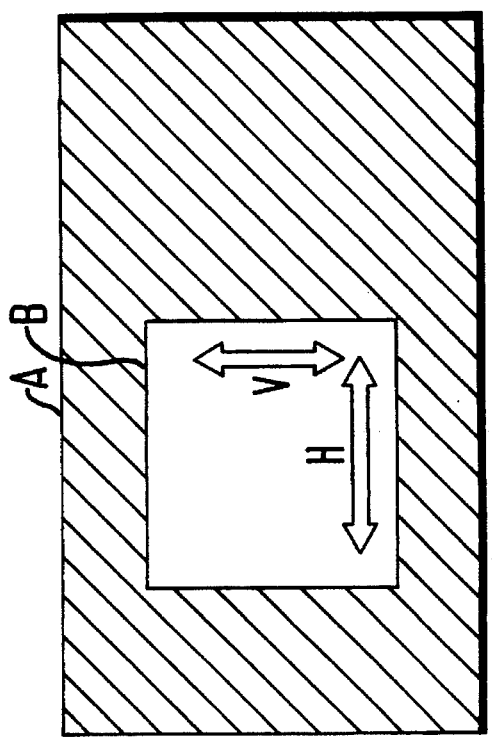
FIG. 4 is a diagram showing an image displayed in the paste-in editing operation.

FIG. 2 is a block diagram showing one embodiment of the image data processing apparatus according to the present invention. FIG. 3 is a flowchart for explaining the operation of the embodiment. And FIG. 4 is a diagram showing an image displayed in the paste-in editing operation.

In FIG. 2, numeral 1 denotes a user-interface which is an inputting device such as a keyboard or a mouse. Numeral 2 denotes a position adjusting means for adjusting the position of an image to be pasted. Numeral 3 denotes data processing means for processing the pasted image data. Numeral 4 denotes image display means for displaying the edited image data. Numeral 5 denotes data compressing means for compressing the edited image data. Numeral 6 denotes optimal value detecting means which detects an amount of the image data compressed by the data compressing means 5 and then judges whether the amount of image data would be adequate or not. Numeral 7 denotes data storing means for storing the image data compressed by the data compressing means 5.

A user performs an editing work for pasting images by using the user-interface 1. The user defines the paste-in position of the paste-in image by the positioning means Z for adjusting the position of the paste-in image according to the mouse and the like (step b in FIG. 3). The data of the paste-in image is pasted to the base image data by the data processing means 3 after the position of the paste-in image has been defined (step c in FIG. 3).

The edited image is displayed by the image display means 4 like a monitor (step d in FIG. 3).

In a case of storing the edited image data, the image data is compressed through a block encoding scheme of the JPEG system by the data compressing means 5 (step e in FIG. 3). The block encoding scheme of the JPEG system typically performs a DCT transform wherein the image data is divided into 8×8 pixel blocks.

The amount of compressed image data is detected by the optimal value detecting means 6 for judging whether the amount is adequate or not for the amount of image becoming minimum (step f in FIG. 3). Here if the image data could be further compressed the position of the pasted image B is fine-adjusted by feeding back the image data to the position adjusting means 2 so as that the pasted image is moved in steps of pixels in the vertical (V) and horizontal (H) directions, sa shown in FIG. 4 (steps b, f in FIG. 3).

The pasted image B is fixed in the position when the amount of the compressed image data has become minimum, and then the image data is stored in the data storing means 7 such as a hard-disc (step g in FIG. 3).

In this embodiment it is possible to decrease the amount of the image data to be stored so as that the amount of the compressed image data is minimized through the automatic adjusting the position of the pasted image in the given space.

Figure 5:
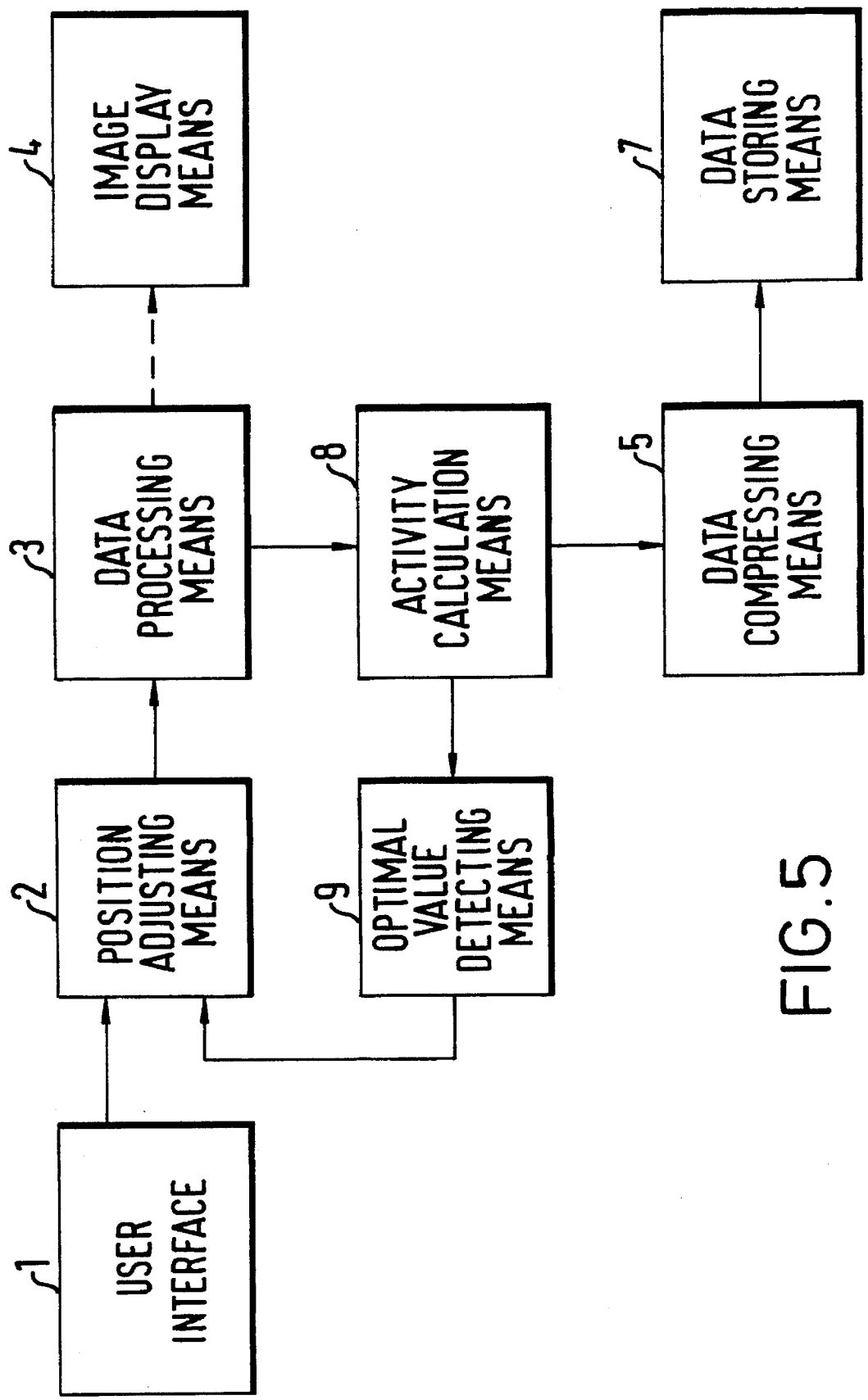
FIG. 5 is a block diagram showing another embodiment according to the present invention.
Figure 6:
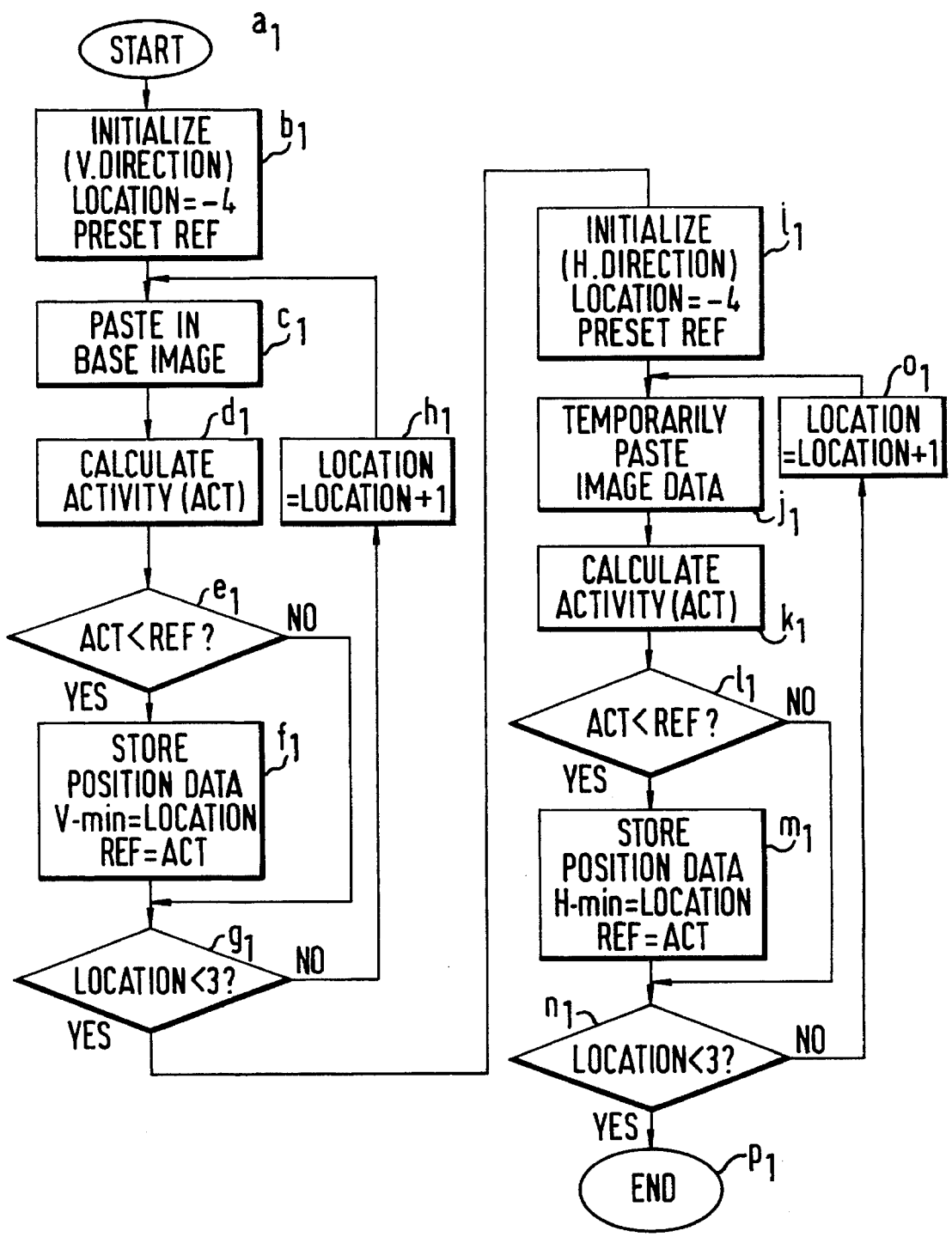
FIG. 6 is a flowchart for explaining the operation of the embodiment shown in FIG. 5.

FIG. 5 is a block diagram showing another embodiment of the present invention. FIG. 6 is a flowchart for explaining the operation of this embodiment. The elements the same as those of the former embodiment showing in FIG. 2 will be explained by assigning the same reference numerals.

In this embodiment, the minimum value of the amount of the image data is achieved by calculating parameters such as total sums of conversion coefficients in the DCT transform which indirectly represent amounts of compressed image data and then comparing the parameters with each other, not but directly comparing the amounts of the compressed image data like the former embodiment as shown in FIG. 2. Hereinafter the parameters which become indications of practical amount of the image data will be generally referred as to "activity".

In FIG. 5, numeral 1 denotes a user-interface which is an inputting device such as a keyboard or a mouse. Numeral 2 denotes a position adjusting means for adjusting the position of an image to be pasted. Numeral 3 denotes data processing means for processing the pasted image data. Numeral 4 denotes image display means for displaying the edited image data. Numeral 5 denotes data compressing means for compressing the edited image data. Numeral 7 denotes data storing means for storing the image data compressed by the data compressing means 5. Numeral 8 denotes activity calculation means for calculating an activity of the edited image data. Numeral 9 denotes optimal value detecting means for detecting the activity calculated by the activity calculation means 8 and including whether the activity has a adequate value or not.

The operation of this embodiment will be explained by using the flowchart of FIG. 6.

A user performs an editing work for pasting images by using the user-interface 1. The user defines the paste-in position of the paste-in image by the positioning means 2 for adjusting the position of the paste-in image according to the mouse and the like (step a1 in FIG. 6). Then a paste-in position in the vertical (V) direction is initialized to the location given by the following equation. i.e.. "location=4. preset REF" (step b1 in FIG. 6).

When the paste-in position is thus defined, the data of the image to be pasted is pasted in the base image data by using the data processing means S (step c1 in FIG. 6).

The image data processed by the data processing means 3 is input to the activity calculation means 8. In the activity calculation means 8 an activity "ACT" is calculated by shifting slightly in the vertical (V) direction (step d1 in FIG. 6). The position where the activity "ACT" takes the least value is defined a reference position in the vertical (V) direction (steps e1, f1, g1 in FIG. 6).

Next, a paste-in position in the horizontal (H) direction is also initialized to the location Siren by the equation, i.e., "location=−4, preset REF" (step i1 in FIG. 6). Now another activity "ACT" is calculated by shifting the image data slightly in the horizontal (H) direction by temporarily pasting the image data in keeping the reference value in the horizontal (H) direction being fixed (step k1 in FIG. 6). The position where the activity "ACT" takes the least value is defined the finalized paste-in position.

The shifting range of the paste-in position basically takes the block size in the DCT transform. In the case that the block has the 8×8 size, the paste-in position is shifted within −4 to +pixels in relative positions from a reference position assigned by the user. The number of shifting in this case, that is, the required number of activity calculations is the 8 times in the vertical (V) direction and the 8 times in the horizontal (H) direction thus resulting the 16 times in total in every image paste work.

Here if the part of the image to be pasted lies off the edge of the base image due to the reference position being within one block from the edge of the base image, the shifting outside the base image and the activity calculation will be omitted.

In this embodiment, the minimum of the compressed image data is obtained by comparing the activities such as the sums of the conversion coefficients in the DCT transform. Although the method of comparing the compressed image data is complicated and takes much time, the method is able to easily define the optimum past-in position by comparing the activities.

Figure 7:
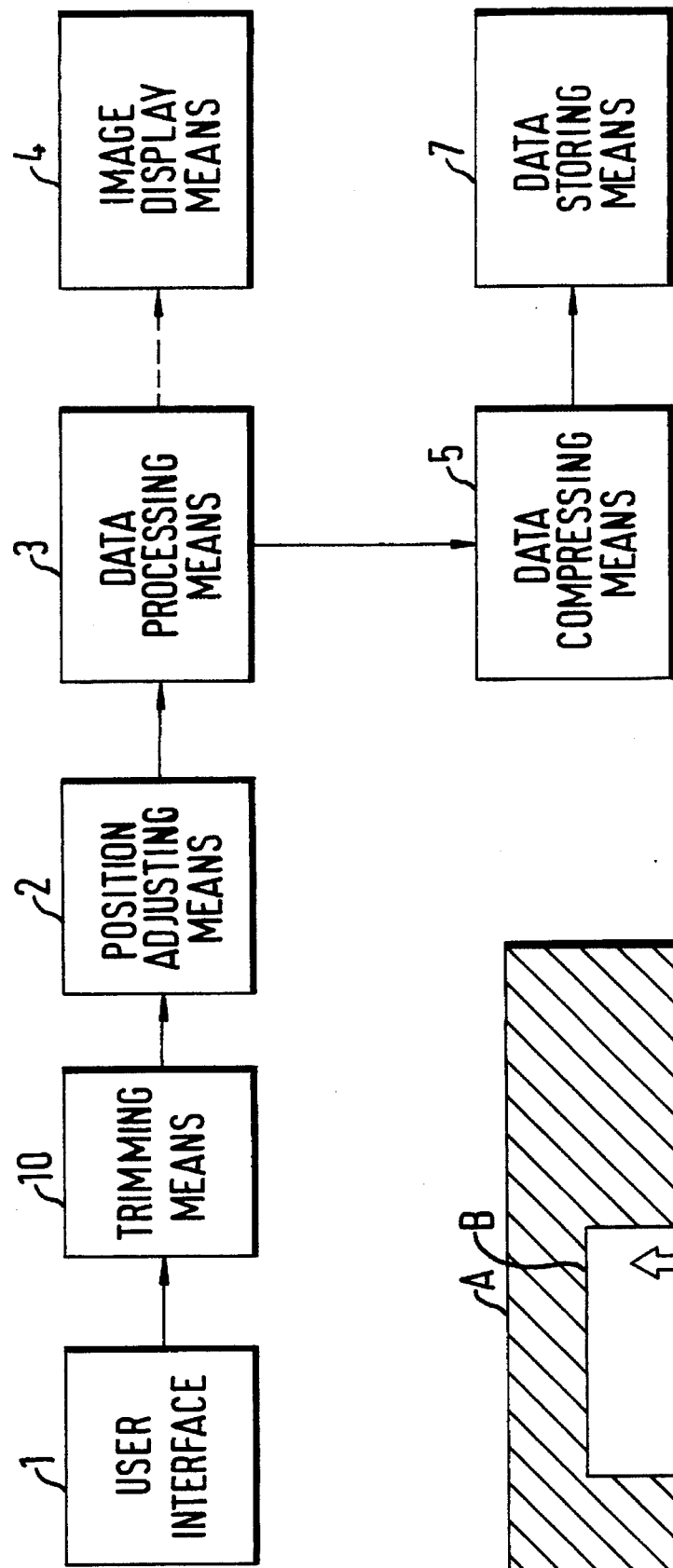
FIG. 7 is a block diagram showing still another embodiment according to the present invention.

FIG. 7 is a block diagram showing still another embodiment of this invention. The elements the same as those of the former embodiment showing in FIG. 1 will be explained by assigning the same reference numerals.

In FIG. 7 numeral 1 denotes a user-interface which is an inputting device such as a keyboard or a mouse. Numeral 2 denotes a position adjusting means for adjusting the position of an image to be pasted. Numeral 3 denotes data processing means for processing the pasted image data. Numeral 4 denotes image display means for displaying the edited image data. Numeral 5 denotes data compressing means for compressing the edited image data. Numeral 1 denotes data storing means for storing the image data compressed by the data compressing means 5. Numeral 10 denotes trimming means for trimming an image to be pasted.

A user performs an editing work for pasting images by using the user-interface 1. In this time, when the image to be pasted has a rectangular shape while the image is highly contrasted from the color on the perimeter of the base image or the image has a relatively rough pattern, the image to be pasted may have the highest compression efficiency by being located its one edge on the boundary of the DCT transformed block.

For this reason, the image to be pasted is automatically trimmed by the trimming means 10 so as that the horizontal and vertical magnitudes of the image take integral multiples of the DCT block with the 8×8 pixels. After that, the image is pasted on the base image so as that all the four edges of the image to be pasted overlap the four boundaries of the DCT block of the base image. At this time the paste-i position is defined to the position nearest to the position assigned by the user so that the pasted image does not give the user any incompatibility.

In this embodiment, the amount of image data to be stored can be decreased with reason that the number of blocks in the block conversion of the image to be compressed can be decreased by pasting the trimmed image on the base image so as that the all edges of the trimmed image overlap the boundaries of the base image.

As described above, the present invention can provide an extremely preferable image data processing apparatus to decrease the amount of compressed image data by shifting the image to be pasted in steps of pixel units. It is also able to improve the picture quality, because that the present apparatus is able to decrease the image distortions such as block distortions, mosquito noises and the like.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention. but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. An image data processing apparatus, comprising:

position adjusting means for adjusting an initial paste-in position in pasting a secondary image in a primary image;

image data editing means for editing a third image resulting from pasting the secondary image in the primary image;

image data compressing means for compressing image data of said third image through block encoding:

optimal value detecting means for detecting an optimal value of the compressed image data by absolutely or relatively determining an amount of the compressed data produced by the image data compressing means; and means for automatically adjusting a paste-in position within a given space around the initial paste-in position so as that the amount of the compressed data becomes a minimum.

* * * * *